United States Patent Office
3,578,665
Patented May 11, 1971

3,578,665
3-HYDRAZINO-1,2,8,9-TETRAAZAPHENALENES
Karl J. Doebel, Ossining, and John E. Francis, Pleasantville, N.Y., assignors to Geigy Chemical Corporation, Ardsley, N.Y.
No Drawing. Continuation-in-part of applications Ser. No. 445,762, Apr. 5, 1965, Ser. No. 539,303, Apr. 1, 1966, and Ser. No. 583,980, Oct. 3, 1966, application Ser. No. 539,303 being a continuation-in-part of said application Ser. No. 445,762, and said application Ser. No. 583,980 being a continuation-in-part of said applications Ser. No. 539,303 and Ser. No. 445,767. This application Mar. 25, 1968, Ser. No. 715,555
Int. Cl. C07d 51/02
U.S. Cl. 261—250         11 Claims

ABSTRACT OF THE DISCLOSURE 3-hydrazino-1,2,8,9-tetraazaphenalenes optionally substituted in the 4, 5, 6, 7 and/or 9 positions and their salts are cardiovascular agents and are prepared from 3-thiono-2,3-dihydro - 1,2,8,9 - tetraazaphenalenes. Representative embodiments are 3-hydrazino-1,2,8,9-tetraazaphenalene and 3-hydrazino-9-phenyl-1,2,8,9-tetraazaphenalene.

CROSS REFERENCE

This is a continuation-in-part of copending applications Ser. Nos. 583,980, 539,303 and 445,762 filed Oct. 3, 1966, Apr. 1, 1966 and Apr. 5, 1965 respectively, Ser. No. 539,-303 being a continuation-in-part of Ser. No. 445,762 and Ser. No. 583,980 being a continuation-in-part of Ser. Nos. 539,303 and 445,767, all of said copending applications now being abandoned.

DETAILED DESCRIPTION

The present invention pertains to 3-hydrazino-1,2,8,9-tetraazaphenalenes of the formula:

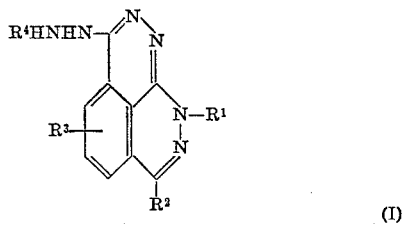

wherein:

$R^1$ is hydrogen, (lower)alkyl, phenyl or phenyl(lower)alkyl;
$R^2$ is hydrogen or phenyl;
$R^3$ is hydrogen, chloro, bromo, hydroxy, (lower)alkoxy, carboxyl or nitro, and
$R^4$ is hydrogen or phenyl and to the acid addition and quaternary salts thereof.

The term "alkyl" and derivations thereof such as "alkoxy" denotes a straight or branched hydrocarbon chain. When qualified by the designation "(lower,)" such chain will contain up to and including 6 carbon atoms. Illustrative of such alkyl groups are methyl, ethyl, propyl, isopropyl, butyl, sec-butyl, t-butyl, pentyl, hexyl, and the like, while illustrative of such alkoxy groups are methoxy, ethoxy, propoxy, butoxy and the like.

The compounds of the present invention are identified herein as derivatives of the novel parent tricyclic nucleus 1,2,8,9-tetraazaphenalene which is assigned the following numbering

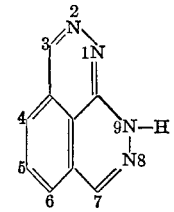

The 3-hydrazino-1,2,8,9-tetraazaphenalenes of the instant invention are cardiovascular agents, in particular, blood-pressure lowering agents. They also manifest coronary and peripheral vascular dilation properties, and anti-inflammatory activity.

These compounds can be administered parenterally or orally in any of the usual pharmaecutical forms including tablets, capsules, powders, suspensions, solutions, syrups and the like, including sustained release preparations which can be compounded by any of the known procedures.

A particularly preferred group of compounds are those of Formula I wherein $R^3$ is hydrogen.

The compounds of the present invention are prepared in a first embodiment via treatment of a 3-thiono-2,3-dihydro-1,2,8,9-tetraazaphenalene of Formula II with a hydrazine of the formula $R^4NHNH_2$

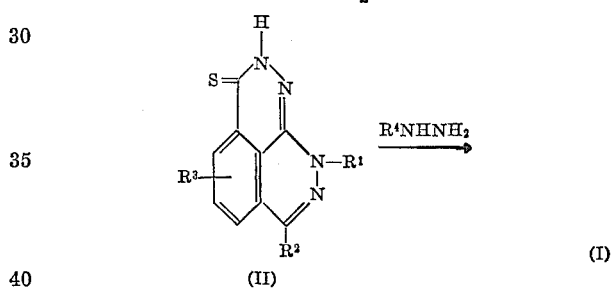

The reaction is carried out with aqueous hydrazine or 100% hydrazine in an organic solvent such as ethanol, methyl Cellosolve, diethylene glycol or diglyme, generally at reflux temperature until the reaction is complete, a period generally of from 16 to 48 hours.

In a second embodiment, the compounds of Formula I are prepared through treatment of a 3-chloro- or 3-bromo-1,2,8,9-tetraazaphenalene of Formula III with a hydrazine of the formula: $R^4NHNH_2$

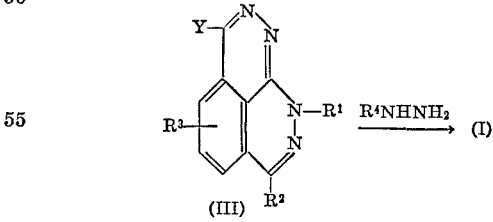

In the above, Y is chloro or bromo. The reaction is carried out at elevated temperatures, generally at reflux, optionally in the presence of a solvent such as methyl Cellosolve, diglyme or triglyme.

When the compounds of Formula I are obtained from the above procedures in less than the desired purity, they can be further purified through conventional methods such as recrystallization, chromatography or the like. Alternatively or in addition, the compounds of Formula I in which $R^4$ is hydrogen may be purified through conversion to a hydrazone of Formula IV:

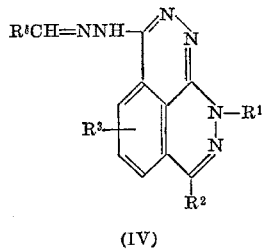

(IV)

wherein $R^5$ is indolyl, pyridyl, styryl or the group:

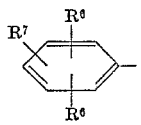

in which each of $R^6$, $R^7$ and $R^8$ is hydrogen, amino, alkoxy, chloro, fluoro, alkanoylamido, cyano or alkyl.

The hydrazine of Formula I is thus reacted with an aromatic aldehyde to form the corresponding hydrazone, generally a high melting substance, which is easily isolated and which upon treatment with strong acid such as hydrochloric acid regenerates the hydrazine starting material of Formula I. In addition to thus being valuable intermediates for purification purposes, the compounds of Formula IV are cardiovascular agents having properties similar to those described for the compounds of Formula I. Thus they are blood pressure lowering agents which manifest coronary and peripheral vascular dilation properties.

The 3-thiono-2,3-dihydro-1,2,8,9-tetraazaphenalenes of Formula II and the 3-halo-1,2,8,9-tetraazaphenalenes of Formula III are obtained from 3-keto-2,3,-dihydro-1,2,8,9-tetraazaphenalenes for Formula V:

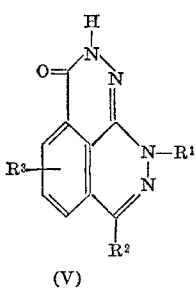

(V)

Thus for example, treatment of a 3-keto-2,3-dihydro-1,2,8,9-tetraazaphenalene of Formula V with phosphorus pentasulfide in refluxing pyriding yields the corresponding thiono analog of Formula II.

Alternatively, treatment of the 3-keto-2,3-dihydro compound of Formula V with phosphorus oxychloride or phosphorus pentachloride and phosphorus oxychloride or phosphorus oxybromide or phosphorus pentabromide and phosphorus oxybromide, generally at elevated temperatures, e.g., at reflux, for twenty or more hours, yields the corresponding 3-halo compound which is then treated with an appropriate hydrazine to yield a compound of Formula I.

The valuable intermediate 3-keto-2,3-dihydro-1,2,8,9-tetraazaphenalenes of Formula V can be prepared by several methods. In a first embodiment, a 3-aldehydo phthalic acid, a 3-benzoylphthalic acid, or a functional equivalent of either is treated with a hydrazine of the formula $R^1NHNH_2$ to yield the corresponding 8-carboxy-1(2H)-phthalazinone:

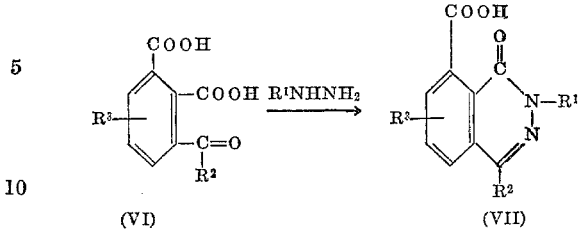

Generally the reaction is easily executed as through heating the reactants, optionally in the presence of a solvent such as alcohol, at temperatures up to about 80° C.

In addition to the 3-carbonylphthalic acids of Formula VI, various functional equivalents may be employed. For example, in place of the aldehyde function there can be a dibromomethyl group, as in 3-dibromomethyl phthalic acid. The aldehyde group can also be in the form of an acetal. Alternatively, or in addition, the carboxylic acid groups can be esterified or be in the form of an anhydride, as in the case of 2-dibromomethyl-6-carbomethoxybenzoic acid or 3-dibromomethylphthalic anhydride. The 3-aldehydo- or 3-benzoylphthalic acid can also be in its tautomeric form, a 3-hydroxy-7-carboxy phthalide, optionally bearing a phenyl group in the 3-position. In these phthalides the hydroxy group in the 3-position can be etherified or replaced by a halogen atom, especially bromo while the carboxylic acid function can be esterified or in the form of an acid halide, as in the case of 3-bromo-7-chlorocarbonylphthalide.

Thus, among the functional equivalents of the phthalic acids of Formula VI are compounds of the formulas:

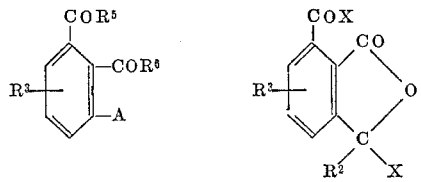

wherein:

A is an aldehyde, benzoyl, dibromomethyl or dialkoxymethyl group;

each of $R^5$ and $R^6$ is alkyl or $R^5$ and $R^6$ taken together are a divalent oxygen atom; and X is hydroxy, alkoxy, chloro or bromo.

These various intermediates can be easily prepared via conventional methods. For example, when the known 3-methylphthalic anhydride or a substituted analog thereof is treated with at least two equivalents of N-bromosuccinimide under the influence of light, a 3-dibromomethyl phthalic anhydride is obtained. Treatment of this anhydride with aqueous base such as sodium hydroxide at from 25 to 90°, followed by acidification with a mineral acid yields 3-aldehydophthalic acid (which in its tautomeric form is 3-hydroxy-7-carboxyphthalide). Esterification under conventional techniques, e.g., an alkanol and a catalytic amount of acid, yield the dialkyl 3-aldehydophthalate (which in its tautomeric form is 3-alkoxy-7-carboalkoxyphthalide).

Likewise bromination of a 2-methyl-6-carbalkoxybenzoic acid (obtained through selective esterification of 3-methylphthalic acid) yields the corresponding 2-dibromomethyl-6-carbalkoxybenzoic acid.

In addition a 7-carboxyphthalide (obtained from a 3-bromomethylphthalic anhydride in a fashion analogous to that described above, i.e., successive treatment with base and acid) is converted to the corresponding 7-halocarbonylphthalide as with phosphorus oxychloride, thionyl chloride or the like and halogenated in the 3-position with a N-halosuccinimide to yield a 3-halo-7-halocarbonylphthalide.

The 1(2H)phthalazinones of Formula VII wherein $R^1$ is hydrogen can also be converted to the corresponding 1(2H)phthalazinones wherein $R^1$ is alkyl or phenylalkyl through alkylation, as with an alkyl or phenylalkyl chloride or bromide in aqueous inorganic base or in a (lower) alkanol in the presence of alkali hydroxide or alkali alkoxide. In this conversion it is generally preferable to first esterify the free carboxy group in the 8-position, as through formation of the acid chloride and treatment with an alkanol.

The 8-carboxy-1(2H)phthalazinone or more preferably an acid chloride or ester thereof, is next treated with hydrazine to yield the 3-keto-2,3-dihydro-1,2,8,9-tetraazaphenalene of Formula V. This reaction with hydrazine generally requires somewhat more drastic conditions than are needed in the formation of the 8-carboxyl-1(2H)-phthalazinone itself, e.g., temperatures above 80°, longer reaction times, etc. Accordingly, the 1(2H)phthalazinone is heated with hydrazine at reflux temperatures for at least 72 hours. Optionally, a high boiling solvent such as methyl Cellosolve, diglyme or triglyme can be present.

Alternatively, the phthalic acids of Formula VI or the functional equivalents thereof discussed above, can be converted directly to the 3-keto-2,3-dihydro-1,2,8,9-tetraazaphenalene of Formula V wherein $R^1$ is hydrogen in essentially one manipulative step, through the use of at least two molar equivalents of hydrazine. This reaction is conducted at elevated temperatures generally above 80°, optionally in the presence of a solvent such as methyl Cellosolve.

It will be appreciated that the 1,2,8,9-tetraazaphenalenes of the present invention can exist in a wide variety of tautomeric forms and all such forms are deemed to be within the scope of the present invention.

Also included within the scope of the present invention are the acid addition salts of these novel tetraazaphenalene derivatives, obtained via the conventional methods. Typical salts thus include those derived from hydrochloric, hydrobromic, sulfuric, phosphoric, methanesulfonic, acetic, lactic, succinic, embonic, malic, maleic, aconitic, phthalic, tartaric and the like acids. Quaternary salts derived from alkyl halides are also within the scope of this invention.

The following examples, presented for illustration and not limitation, will serve to further typify the nature of the present invention. In these examples temperature is expressed in degrees centigrade.

EXAMPLE 1

3-keto-2,3-dihydro-1,2,8,9-tetraazaphenalene

A mixture of 3-methylphthalic anhydride (81 g.), N-bromosuccinimide (182 g.), benzoyl peroxide (40 mg.) and carbon tetrachloride (1500 ml.) is irradiated and heated at reflux by a 100 watt insertion-type ultraviolet lamp under stirring and exclusion of moisture. After the mixture becomes brick red, an additional 40 mg. of benzoyl peroxide is added. Illumination at reflux is carried out during 24 hours. The mixture is cooled and filtered free of succinimide and the filtrate is evaporated in vacuo. The residual yellowish brown solid is dissolved in hot ether, treated wtih decolorizing charcoal and filtered. Addition of hexane to the filtrate affords the crystalline product, α,α-dibromo-3-methylphthalic anhydride, M.P. 90.5–93° C. in 72% yield. Two recrystallizations from ether-hexane yield colorless needles melting at 93–95° C.

Calcd. for $C_9H_4Br_2O_3$ (percent): C, 33.78; H, 1.26; Br, 49.92. Found (percent): C, 33.66; H, 1.20; Br, 49.41.

A suspension of α,α-dibromo-3-methylphthalic anhydride (80 g.) in ethanol (500 ml.) is treated with a solution of 100% hydrazine hydrate (100 ml.) and water (10 ml.) dropwise under stirring and cooling. A white suspension forms. After the addition, the temperature is raised gradually to reflux, whereupon the white suspension disappears and a yellow precipitate forms. After 88 hours at reflux, the mixture is cooled, filtered and the first crop of product is washed with water and ethanol and dried in vacuo. The mother liquors are evaporated in vacuo, dissolved in 50 ml. of glacial acetic acid and heated under reflux for 18 hours. The mixture is cooled and filtered and a second crop of the product obtained. The overall yield of 3-keto-2,3-dihydro-1,2,8,9-tetraazaphenalene, M.P. >347°, is 25.7 g., or 55% of theory. The product is recrystallized from 3 liters of boiling dimethylformamide and obtained as a yellow powder which, on heating, forms a microcrystalline solid at 220–270° C. and melts above 350° C.

Calcd. (percent): C, 58.06; H, 3.25; N, 30.09. Found (percent): C, 57.92, 58.03; H, 3.58, 3.52; N, 30.28.

EXAMPLE 2

3-keto-2,3-dihydro-1,2,8,9-tetraazaphenalene (a) 8-carboxy-1(2H)phthalazinone.—α,α - Dibromo-3-methylphthalic anhydride (40 g.) is added in portions to a hot solution of 2 N sodium hydroxide (500 ml.) with stirring. After ten minutes, the clear solution is rendered strongly acidic with concentrated hydrochloric acid and heated for one-half hour at 80°. The solution is evaporated to dryness in vacuo and the residue is then dissolved in hot water (600 ml.), treated with decolorizing charcoal and filtered. After three days at 5° C., the colorless filtrate yields 21.3 g. (88%) of colorless blocks of 3-hydroxy-7-carboxyphthalide, M.P. 165.5–168.5° C., obtains after two further crystallizations from water.

Calcd. for $C_9H_6O_5$ (percent): C, 55.68; H, 3.12. Found (percent): C, 55.98; H, 2.99.

A mixture of 3-hydroxy-7-carboxyphthalide (30.2 g.) 100% hydrazine hydrate (50 ml.) and water (100 ml.) is heated under reflux for 16 hours. The yellow mixture which forms is then rendered acidic under stirring with dilute hydrochloric acid. The pasty mass which forms is filtered, washed with water and dried at 100° in vacuo. 8-Carboxy-1(2H)phthalazinone, M.P. 300.5–306° C., is obtained in a yield of 99%, and is recrystallized once from glacial acetic acid, M.P. 303.5–306° C.

Calcd. (percent): C, 56.84; H, 3.18; N, 14.73. Found (percent): C, 57.02; H, 3.15; N, 14.65.

8-carboxy-1(2H)phthalazinone can also be directly obtained from α,α-dibromo-3-methylphthalic anhydride by refluxing with hydrazine hydrate, either 100% hydrazine hydrate in chloroform or 50% aqueous hydrazine hydrate in ethanol.

(b) 3-keto-2,3-dihydro-1,2,8,9-tetraazaphenalene. — To a cold stirring suspension of 8-carboxy-1(2H)phthalazinone (7.6 g.) in absolute methanol (100 ml.) is added an ethereal solution of diazomethane (approx. 1.0 mole). The mixture is stirred under moisture exclusion overnight at room temperature and then evaporated in vacuo. The resultant yellow powder (8.9 g.) is triturated with cold dilute sodium carbonate and filtered. Recrystallization of the dried solid (6.25 g.), M.P. 205–208° C., from methanol yields pure 8-carbomethoxy-1(2H)phthalazinone, M.P. 207–209° C.

Calcd. (percent): C, 58.82; H, 3.95; N, 13.72. Found (percent): C, 58.77; H, 3.99; N, 13.86.

A solution of 8-carbomethoxy-1(2H)phthalazinone (1.02 g.) in 100% hydrazine hydrate (5 ml.) and absolute ethanol (20 ml.) is heated at reflux for 110 hours, then is cooled and filtered. The precipitate is washed with water, then methanol and dried in vacuo. The yield of 3-hydroxy-2,3-dihydro - 1,2,8,9 - tetraazaphenalene, M.P. >350° C. is 0.78 g., or 84% of theory.

EXAMPLE 3

3-keto-9-methyl-2,3-dihydro-1,2,8,9-tetraazaphenalene (a) 7 - carboxyphthalide.—Crude 3 - bromomethylphthalic anhydride (47.6 g.) prepared according to the procedure of Albisetti, Barney, Cairns and Winberg, U.S. 2,729,622, is dissolved in ethanol (100 ml.) and aqueous 2 N sodium hydroxide (500 ml.) and heated for 15 minutes at 80°. The pale yellow solution is cooled, rendered acidic with concentrated hydrochloric acid, heated at 80° for one hour and refrigerated overnight. The acid (35.4 g., M.P. 166–9° C.) separates in buff crystals. Two recrystallizations from methanol yield colorless blocks, M.P. 168.5–171° C.

Calcd. (percent): C, 60.66; H, 3.40. Found (percent): C, 60.41; H, 3.35.

(b) 7-phthalidylcarbonyl chloride.—A mixture of 7-carboxyphthalide (38.54 g.) thionyl chloride (27 ml.) and dry benzene (108 ml.) is heated at reflux with exclusion of moisture for 3 hours. The excess solvent and thionyl chloride are removed by distillation in vacuo and the solid residue is recrystallized from benzene-hexane. The yield of product, M.P. 92–96.5° C., is 30.78 g., or 73% of theory.

(c) 7-carbethoxyphthalide.—7-phthalidylcarbonyl chloride (30.78 g.) and absolute ethanol (184.5 ml.) are heated under reflux under moisture exclusion for 30 minutes. The solvent is partially evaporated, whereupon the first crop of product crcystallizes. The mother liquors are evaporated in vacuo to dryness, triturated with ethanol and filtered. The two crops are recrystallized from benzene and 23.1 g. (65%) of product, M.P. 89.5–92.5° C. are obtained. Recrystallization from ethanol yields the pure ester, M.P. 90.5–92° C.

Calcd. (percent): C, 64.07; H, 4.89. Found (percent): C, 64.10; H, 4.88.

(d) 3-bromo-7-carbethoxyphthalide.—A mixture of 7-carbethoxyphthalide (17.78 g.), N-bromosuccinimide (15.52 g.), carbon tetrachloric (345 ml.) and benzoyl peroxide (40 mg.) is brought to incipient reflux with stirring and exclusion of moisture and then illuminated with a 250 watt tungsten lamp. No color change is apparent but after 25 minutes, all of the N-bromosuccinimide has been converted to succinimide. The mixture is cooled, filtered and the filtrate evaporated in vacuo to 25.2 g. of amber oil. The infrared spectrum of the oil shows peaks at 1720 cm.$^{-1}$ (ester) and 1800 cm.$^{-1}$ ($\gamma$-lactone).

(e) 8-carbethoxy-1(2H)phthalazinone.—3-bromo-7-carbethoxyphthalide, 25.2 g.) is dissolved in absolute ethanol (1.72 ml.) whereupon a white precipitate forms. 100% hydrazine hydrate (17.25 ml.) in absolute ethanol (172 ml.) is added dropwise with stirring and cooling and the mixture is heated at reflux for 16 hours and then filtered free of the white precipitate. The filtrate is evaporated to dryness in vacuo, triturated with 1 N HCl (150 ml.) and filtered. The resulting insoluble yellow precipitate and the filtrate are extracted separately with chloroform. The extracts are combined and concentrated in vacuo to a yellow solid (7.15 g.). This crude ester is purified by chromatography over neutral alumina and recrystallized from ethanol to yield to product as colorless blocks, M.P. 169.5–171.5° C.

Calcd. (percent): C, 60.54; H, 4.62; N, 12.84. Found (percent): C, 60.54; H, 4.62; N, 12.62.

(f) 2-methyl-8-carbethoxy-1(2H)phthalazinone.—8-carbethoxy-1((2H)phthalazinone (6 g.) is dissolved almost completely in 2 N sodium hydroxide (22 ml.) and water (22 ml.). More water (100 ml.) is added, followed by dimethylsulfate (6 ml.) dropwise under stirring. An oil forms at first but it slowly crystallizes. After one hour, the acidic solution is basified with 5 ml. of 2 N sodium hydroxide. Methylsulfate (1.8 ml.) is again added dropwise under stirring and the mixture stirred for 16 hours at room temperature. The white precipitate which forms is collected, washed with cold water and dried in vacuo. The filtrate is made slightly basic and extracted several times with chloroform. Concentration of the chloroform layer yields a pale yellow solid whose infrared spectrum was identical to the first crop of material. The first crop is recrystallized from benzene-cyclohexane with the aid of decolorizing carbon in white needles melting in the range 103.5–105°.

Calcd. for $C_{12}H_{12}N_2O_3$ (percent): C, 62.06; H, 5.21; N, 12.07. Found (percent): C, 62.25; H, 5.50; N, 11.98.

The infrared spectrum (chloroform) shows prominent bands at 1735 cm.$'^{-1}$ (ester carbonyl) and 1655 cm.$^{-1}$ (amide carbonyl).

Alternatively, intermediates of this type, such as 2-methyl-8-carbomethoxy-(2H)phthalazinone can be prepared via the following procedure: 8-carbomethoxy-1(2H)phthalazinone (2.04 g.) obtained through the use of methanol rather than ethanol in part (c) is dissolved in warm absolute methanol (70 ml.) and treated under stirring with sodium methoxide (0.60 g.), whereupon a solution forms. Methyl iodide (0.63 ml.) is added and the whole refluxed under exclusion of moisture for one hour, then stirred at room temperature for 16 hours. The orange-yellow solution is evaporated to small volume, treated with warm water and filtered. As the filtrate cools, colorless crystals precipitate from it. The product is collected and washed with cold water. This material, M.P. 115–121.5°, is purified by two crystallizations from water whereupon it melts at 125–126°.

(g) 3-keto-9-methyl-2,3-dihydro-1,2,8,9-tetraazaphenalene.—To a solution of hydrazine hydrate (5 ml.) in methyl Cellosolve (20 ml.) is added 2-methyl-8-carbethoxy-1(2H)phthalazinone (1.16 g.). The whole is stirred at reflux for 26 hours, during which time a yellow solution forms. The solution is filtered hot and the filtrate allowed to cool under refrigeration. The yellow crystals which precipitate are collected, washed with methanol and dried. The mother liquor is evaporated to dryness in vacuo and the residue triturated with hot methanol and filtered. The precipitate is a second crop of the product. The combined material, M.P. 300–304°, (386 mg.) is recrystallized from methyl Cellosolve and the pure product obtained in bright yellow needles, melting at 305–306°.

Calcd. for $C_{10}H_8N_4O$ (percent): C, 59.99; H, 4.03; N, 27.99. Found (percent): C, 59.91; H, 4.18; N, 28.12.

The infrared spectrum (Nujol) reveals a prominent amide carbonyl peak at 1655 cm.$^{-1}$.

EXAMPLE 4

3-keto-9-ethyl-2,3-dihydro-1,2,8,9-tetraazaphenalene 8-carbethoxy-1(2H)phthalazinone (3.0) is dissolved in 2 N sodium hydroxide (11.0 ml.). Water (60 ml.) is added, followed by diethylsulfate (4.2 ml.) dropwise under stirring. The mixture is stirred 60 hours at room temperature and then brought to pH 4 with a few drops of 2 N sodium hydroxide. The mixture is stirred 2 hours longer, and the oily mixture extracted with chloroform. The chloroform layer is dried over sodium sulfate and concentrated in vacuo. A yellow oil is obtained, which is purified by distillation in a Spaeth apparatus at 0.03 mm. with an air bath temperature of 160°. The I.R. spectrum of the colorless oily product taken in chloroform reveals strong bands at 1735 cm.$^{-1}$ (ester carbonyl) and 1655 cm.$^{-1}$ (amide carbonyl), thus indicating that the product is 2-ethyl-8-carbomethoxy-1(2H)phthalazinone. This ester (1.6 g.) is suspended in a mixture of hydrazine hydrate (5.7 ml.) and methyl Cellosolve (23 ml.) and heated at reflux for 96 hours. The resulting yellow solution is evaporated to dryness in vacuo and the yellow residue triturated with methanol and filtered. The precipitate (0.5 g.) is recrystallized from water and the pure product obtained as yellow needles, M.P. 218–219°.

Calcd. for $C_{11}H_{10}N_4O$ (percent): C, 61.67; H, 4.71; N, 26.15. Found (percent): C, 61.42; H, 4.79; N, 26.07.

The infrared spectrum (Nujol) shows a strong amide carbonyl band at 1650 cm.$^{-1}$.

EXAMPLE 5

3-keto-9-phenyl-2,3-dihydro-1,2,8,9-tetraazaphenalene (a) 8-carboxy-2-phenyl-1(2H)phthalazinone.—A mixture of phenylhydrazine (3.6 ml.), 3-hydroxy-7-carboxyphthalide (5.82 g.) and glacial acetic acid (100 ml.) is heated under reflux for 18 hours. The clear solution is evaporated to dryness in vacuo and the residual solid triturated with methanol and collected. The product (6.97 g.), M.P. 197–199°, is recrystallized from benzene and a colorless crystalline product, M.P. 197–198°, obtained.

Calcd. for $C_{15}H_{10}N_2O_3$ (percent): C, 67.66; H, 3.79; N, 10.52. Found (percent): C, 67.28; H, 3.75; N, 10.82.

The infrared spectrum (Nujol) shows prominent peaks at 1720 cm.$^{-1}$ (carboxyl group) and 1650 cm.$^{-1}$ (amide carbonyl).

(b) 8-carbethoxy-2-phenyl-1(2H)phthalazinone.—To a solution of thionyl chloride (40 ml.) in chlorobenzene (150 ml.) is added under stirring 8-carboxy-2-phenyl-1(2H)-phthalazinone (24.3 g.) and the mixture heated at reflux under moisture exclusion for 2 hours. When the evolution of gas has ceased, the solution is evaporated to dryness in vacuo. The residual white solid (24.7 g.) is treated with absolute ethanol (350 ml.) and heated under reflux for 18 hours. The solution is filtered hot and allowed to cool slowly. The ester precipitates in colorless needles, M.P. 150–151°. This material (23.9 g.) is recrystallized from ethanol. The melting point is unchanged.

Calcd. for $C_{17}H_{14}N_2O_3$ (percent): C, 69.37; H, 4.79; N, 9.52. Found (percent): C, 69.08; H, 4.65; N, 9.36.

(c) 3-keto-9-phenyl-2,3-dihydro-1,2,8,9-tetraazaphenalene.—A mixture of 2-phenyl-8-carbethoxy-1(2H)-phthalazinone (11.76), 100% hydrazine hydrate (40 ml.) and methyl Cellosolve (160 ml.) is heated at reflux for 25 hours. The yellow solution is filtered and treated with methanol (100 ml.) followed by water dropwise under stirring. A flocculent yellow precipitate forms. The mixture is cooled and the product collected, washed thoroughly with water and ethanol and dried in vacuo. The solid (4.44 g.), M.P. 254–6°, is recrystallized from methyl Cellosolve and obtained as yellow needles, M.P. 255–7°.

Calcd. for $C_{15}H_{10}N_4O$ (percent): C, 68.70; H, 3.85; N, 21.37. Found (percent): C, 68.81; H, 3.90; N, 21.20.

EXAMPLE 6

3-keto-9-benzyl-2,3-dihydro-1,2,8,9-tetraazaphenalene

To a suspension of sodium methoxide (7 g.) in dry dimethylsulfoxide (500 ml.) is added 3-keto-2,3-dihydro-1,2,8,9-tetraazaphenalene (18.6 g.) and the mixture is heated to 60° C. Benzyl bromide (14 ml.) is added under stirring and the mixture stirred at 60° for 2 hours. The dark mixture is poured into ice-water, stirred for 20 minutes and filtered. The dark brown precipitate is collected, washed with water, dried and then suspended in ethanol (400 ml.). The insoluble tan-colored solid is collected (18.3 g.) and recrystallized from methyl Cellosolve with decolorizing charcoal added. A crop of 5.3 g. of solid is obtained on cooling and a second crop (4.1 g.) slowly crystallizes from the mother liquor. The combined material is recrystallized three times from ethanol, the product (4.1 g.) thus obtained melting at 329–243°.

Calcd. for $C_{16}H_{12}N_4O$ (percent): C, 69.54; H, 4.38; N, 20.28. Found (percent): C, 69.25; H, 4.54; N, 20.38.

Similarly through the use of methyl iodide there is obtained 3-keto-9-methyl-2,3-dihydro-1,2,8,9-tetraazaphenalene, M.P. 289–293° C.

EXAMPLE 7

3-keto-9-n-butyl-2,3-dihydro-1,2,8,9-tetraazaphenalene

To a stirring mixture of 3-keto-2,3-dihydro-1,2,8,9-tetraazaphenalene (55.8 g.), sodium methoxide (18 g.) and dry dimethylsulphoxide (450 cc.) at 60° is added n-butyl bromide (42 g.). The mixture is stirred at 60° for 4 hours and then poured into ice-water. The solid which forms is collected, washed with water, suspended in hot methyl Cellosolve and filtered. The filtrate is evaporated to dryness and the residue recrystallized once from methyl Cellosolve-water mixture and twice from benzene to yield the product, M.P. 189–194°.

Calcd. for $C_{13}H_{14}N_4O$ (percent): C, 64.44; H, 5.83; N, 23.13. Found (percent): C, 64.36; H, 5.84; N, 23.18.

EXAMPLE 8

3-keto-7-phenyl-2,3-dihydro-1,2,8,9-tetraazaphenalene (a) 4-phenyl-8-carboxy-1(2H)phthalazinone.—3-benzoylphthalic acid (32.5 g.) prepared by permanganate oxidation of 2-methyl-6-benzoylbenzoic acid, hydrazine hydrate (85 ml.) and water (145 ml.) are heated at reflux for 18 hours. The mixture is cooled and rendered acidic with hydrochloride acid. The solid which precipitates is recrystallized from glacial acetic acid to yield 4-phenyl-8-carboxy-1(2H)phthalazinone, M.P. 257–259°.

Calcd. for $C_{15}H_{10}N_2O_3$ (percent): C, 67.66; H, 3.79; N, 10.52. Found (percent): C, 67.87; H, 3.68; N, 10.82.

(b) 4-phenyl-8-carbomethoxy-1(2H)phthalazinone.— A mixture of 4-phenyl-8-carboxy-1(2H)phthalazinone (19.0 g.), thionyl chloride (32 ml.) and chlorobenzene (115 ml.) is stirred at reflux under moisture exclusion for three hours. The solution is concentrated at reduced pressure to a white solid which is dissolved in methanol (300 ml.) and heated at reflux for 18 hours. The mixture is cooled and the crystalline ester, M.P. 198–202°, collected. This material can be used directly in the following step.

(c) 3-keto-7-phenyl-2,3-dihydro-1,2,8,9-tetraazaphenalene.—A mixture of 4-phenyl-8-carbomethoxy-1(2H)-phthalazinone (18.6 g.), hydrazine hydrate (400 cc.) and water (100 cc.) is heated at reflux for 20 hours. The mixture is cooled and the precipitate is collected, washed with water and recrystallized from methyl Cellosolve to yield the product, M.P. above 350° C.

Calcd. for $C_{15}H_{10}N_4O$ (percent): C, 68.70; H, 3.85; N, 21.37. Found (percent): C, 68.89; H, 3.62; N, 21.39:

EXAMPLE 9

3-keto-9-(2-phenethyl)-2,3-dihydro-1,2,8,9-tetraazaphenalene (a) 2-(2-phenethyl)-8-carboxy-1(2H)phthalazinone.— To a mixture of anhydrous sodium acetate (28.4 g.) glacial acetic acid (1300 ml.) and 2-phenethylhydrazine sulphate (26.0 g.) is added 3-hydroxy-7-carboxyphthalide (19.4 g.). The mixture is stirred at reflux for 18 hours, filtered hot and evaporated to dryness. The residue is triturated with chloroform and the chloroform layer is extracted with 5% sodium carbonate solution. The alkaline extracts are cautiously rendered acidic with 6 N hydrochloric acid and the material which precipitates is extracted with chloroform. The dried chloroform extracts are evaporated to dryness and the residue is taken up in boiling benzene, filtered and slowly treated with hexane. The white precipitate which forms is collected, washed with hexane and dried. The product (M.P. 115–123°) can be further purified through recrystallizations from ethanol-water. (M.P. 119–122° C.).

Calcd. for $C_{17}H_{14}N_2O_3$ (percent): C, 69.37; H, 4.79; N, 9.52. Found (percent): C, 69.40; H, 4.67; N, 9.48.

(b) 2-(2-phenethyl)-8-carbomethoxy-1(2H)phthalazinone.—A mixture of 2-(2-phenethyl)-8-carboxy-1(2H)phthalazinone (8.0 g.), thionyl chloride (13 ml.) and chlorobenzene (60 ml.) is heated at reflux with stirring and exclusion of moisture for 2.5 hours. The solution is then evaporated to dryness at reduced pressure and the residue heated with absolute methanol (200 ml.) at reflux for 66 hours. The mixture is filtered hot and the filtrate cooled at −20° C. overnight. The precipitated product is collected, washed with a little cold methanol, dried and recrystallized from methanol, M.P. 113–114°.

Calcd. for $C_{18}H_{16}N_2O_3$ (percent): C, 70.11; H, 5.23; N, 9.09. Found (percent): C, 70.00; H, 5.23; N, 8.95.

(c) 3-keto-9-(2-phenethyl)-2,3-dihydro-1,2,8,9-tetraazaphenalene.—A mixture of 2-(2-phenethyl)-8-carbomethoxy-1(2H)phthalazinone (32.5 g.), 100% hydrazine hydrate (400 cc.) and water (70 cc.) is stirred at reflux for 20 hours and then cooled. The yellow precipitate is collected, washed thoroughly with water, air dried, and recrystallized twice from chloroform to afford the product, M.P. 203–5°.

Calcd. for $C_{17}H_{14}N_4O$ (percent): C, 70.32; H, 4.86; N, 19.30. Found (percent): C, 70.13; H, 4.87; N, 19.33.

EXAMPLE 10

3-keto-9-isopropyl-2,3-dihydro-1,2,8,9-tetraazzaphenalene (a) 8-carbomethoxy-1(2H)phthalazinone.—To a suspension of 8-carboxy-1(2H)phthalazinone (182 g.) in chlorobenzene (1200 cc.) is added thionyl chloride (250 cc.). This mixture is stirred at reflux with moisture exclusion for four hours, cooled and filtered. The white precipitate is washed with benzene, air dried, and suspended in absolute methanol (1500 cc.). This mixture is heated at reflux under moisture exclusion for 18 hours, cooled to 0° and filtered. The solid thus collected is washed with cold absolute methanol and air dried, M.P. 213–215° C.

(b) 3-keto-9-isopropyl-2,3-dihydro-1,2,8,9-tetraazaphenalene.—8-carbomethoxy-1(2H)phthalazinone (20.4 g.) is suspended in methanol (250 ml.) and treated with a mixture of 2-iodopropane (17 g.), 1 N sodium hydroxide (100 ml.) and methanol (100 ml.). This mixture is stirred on the steam bath for 3 hours and then evaporated to dryness at reduced pressure. The residue is suspended in a mixture of methanol (50 ml.), 100% hydrazine hydrate (420 ml.) and water (140 ml.) and heated at reflux for 66 hours. The mixture is cooled and the yellow solid collected, washed with water and dried. The crude product is triturated with hot chloroform (800 ml.), filtered and the filtrate evaporated to dryness at reduced pressure. The product, M.P. 266–268°, is recrystallized three times from ethanol, M.P. 258–259°.

Calcd. for $C_{12}H_{12}N_4O$ (percent): C, 63.14; H, 5.30; N, 24.55. Found (percent): C, 62.98; H, 5.46; N. 24.53.

EXAMPLE 11

3-thiono-2,3-dihydro-1,2,8,9-tetraazaphenalene

A mixture of 3-keto-2,3-dihydro-1,2,8,9-tetraazaphenalene (44.14 g.), phosphorous pentasulfide (58.2 g.) and dry pyridine (356 ml.) is heated at reflux for 2.5 hours under stirring and exclusion of moisture. The dark red solution is cooled and poured under stirring into one liter of ice-cold saturated salt solution. The mixture is stirred for 1½ hours, then filtered and the precipitate washed thoroughly with water and dried at 100° C. in vacuo. The orange solid (35.0 g., M.P. 298–320° dec.) is recrystallized once from methyl Cellosolve-water (during which operation a small amount of insoluble solid is removed) and once from dimethylformamide-water. The powdery solid melts at 318–322° on a block preheated to 250°.

Calcd. (percent): C, 53.45; H, 2.99; N, 27.71. Found (percent): C, 53.37; H, 3.00; N, 27.85.

EXAMPLE 12

3-thiono-9-phenyl-2,3-dihydro-1,2,8,9-tetraazaphenalene

A mixture of 3-keto-9-phenyl-2,3-dihydro-1,2,8,9-tetraazaphenalene (2.6 g.), phosphorus pentasulfide (2.5 g.) and dry pyridine (15 ml.) is stirred for 2½ hours under reflux, cooled slightly and poured into ice-cold sodium chloride solution (200 ml.). The mixture is stirred for 1½ hours and the yellow precipitate which is formed is collected by filtration, washed with water and dried. The solid is recrystallized from ethanol to yield 1.68 g. of golden yellow plates, M.P. 232–234° C.

Calcd. for $C_{15}H_{10}N_4S$ (percent): C, 64.72; H, 3.62; N, 20.13; S, 11.52. Found (percent): C, 65.02; H, 3.50; N, 20.23; S, 11.64.

EXAMPLE 13

3-thiono-9-methyl-2,3-dihydro-1,2,8,9-tetraazaphenalene 3-keto-9-methyl-2,3-dihydro-1,2,8,9-tetraazaphenalene (9.0 g.) is dissolved in dry pyridine (120 ml.) and phosphorus pentasulfide (12 g.) added under stirring. The whole is refluxed under moisture exclusion for 2½ hours, poured into an ice-salt mixture and stirred for 30 minutes. The yellow solid which forms is collected, washed with water and dried as well as possible in vacuo. The material is recrystallized three times from methyl Cellosolve to yield the product, M.P. 299–316°.

Calcd. for $C_{10}H_8N_4S$ (percent): C, 55.53; H, 3.73; N, 25.91; S, 14.83. Found (percent): C, 55.40; H, 3.82; N, 26.06; S, 14.72.

EXAMPLE 14

3-thiono-9-benzyl-2,3-dihydro-1,2,8,9-tetraazaphenalene 3-keto-9-benzyl-2,3-dihydro-1,2,8,9-tetraazaphenalene (2.76 g.) is suspended in dry pyridine (25 ml.) and phosphorus pentasulfide (2.5 g.) added under stirring and the mixture stirred at reflux under moisture exclusion for 3 hours. The dark solution is poured into ice-water, whereupon an orange solid precipitates. The mixture is stirred 30 minutes, filtered and the precipitate washed with water and dried. The crude product is recrystallized from methyl Cellosolve and obtained as yellow needles (1.7 g.), M.P. 278°–279.5°.

EXAMPLE 15

3-hydrazino-1,2,8,9-tetraazaphenalene

A mixture of 3-thiono-2,3-dihydro-1,2,8,9-tetraazaphenalene (30 g.) and 85% hydrazine hydrate (500 ml.) is refluxed under vigorous stirring for 20 hours. The mixture is cooled, filtered and the yellow precipitate washed with water and dried in vacuo. The free base (21.0 g.) is suspended in excess 3 N hydrochloric acid, filtered free of residual solid and evaporated in vacuo. The residue is triturated with methanol, filtered and recrystallized by dissolution in water followed by addition of methanol and concentrated hydrochloric acid. A further recrystallization from water-concentrated hydrochloric acid yields the product as the dihydrochloride, M.P. 245–248° C. (dec.), on slow heating.

Calcd. (percent): C, 39.57; H, 3,69; N, 30.77; Cl, 25.97. Found (percent): C, 39.68; H, 4.34; N, 30.78; Cl, 25.65.

The same material is obtained by treatment of the mercapto compound with 100% hydrazine hydrate in diglyme at reflux for 7 hours or with 100% hydrazine hydrate in methyl Cellosolve at reflux for 20 hours. The product can also be isolated on treatment of the mercapto compound with 100% hydrazine hydrate in refluxing ethanol after 7 hours, but further purification is required to free the product from starting material.

EXAMPLE 16

3-hydrazino-1,2,8,9-tetraazaphenalene dimethanesulfonate 3-hydrazino-1,2,8,9-tetraazaphenalene (2.0 g.) is suspended in absolute ethanol (60 ml.) and methanesulfonic acid (1.3 ml.) in ethanol (20 ml.) is added dropwise under stirring. At first, an almost clear solution is formed but after about one half hour, an orange precipitate forms. The mixture is heated to about 50° C. for 15 minutes, cooled and filtered. The product is recrystallized twice from methanol-ether and a constant melting point of 235–237° C. is obtained.

Calcd. (percent): C, 33.67; H, 4.11; N, 21.42. Found (percent): C, 33.94; H, 4.40; N, 21.46.

EXAMPLE 17

3-hydrazino-9-benzyl-1,2,8,9-tetraazaphenalene hydrochloride

A mixture of 3-thiono-9-benzyl-2,3-dihydro-1,2,8,9-tetraazaphenalene (5.4 g.), 100% hydrazine hydrate (230 ml.) and water (60 ml.) is stirred under reflux for 18 hours. The mixture is cooled and the yellow product collected and dried. The solid is suspended in 6 N hydrochloric acid, filtered and the filtrate evaporated to dryness in vacuo. The residue is recrystallized once from methanol-ether and twice from methanol to give pale yellow needles melting at 266–267°. For analysis, the substance is dried at 65° for 16 hours at 0.1 mm.

Calcd. for $C_{16}H_{14}N_6$ HCl (percent): C, 58.80; H, 4.62; N, 25.72; Cl, 10.81. Found (percent): C, 57.71; H, 4.43; N, 25.31; Cl, 10.81.

EXAMPLE 18

3-hydrazino-9-phenyl-1,2,8,9-tetraazaphenalene

To a solution of hydrazine hydrate (100%) (54 ml.) and water (10 ml.) at 80–90° is added in small portions with stirring 3-thiono - 9 - phenyl - 2,3 - dihydro-1,2,8,9-tetraazaphenalene (5.6 g.). The reaction mixture is heated at reflux for 18 hours and the orange mixture filtered hot. The precipitate is washed repeatedly with distilled water and then taken up in 3 N hydrochloric acid. The mixture is washed twice with chloroform and the aqueous acidic layer is treated with charcoal, filtered and the filtrate evaporated at 60° to a small volume. Pale yellow crystals appear. The mixture is cooled and the crystals of product are collected. Yield: 3.05 g. Evaporation of the mother liquor to dryness yields an additional 2.4 g. of crystals.

This material is further purified via the following conversion. The combined material is taken up in 60 ml. of cold water, filtered free of some insoluble solid and placed in a 3 necked 300 cc. flask equipped with mechanical stirrer, condenser and dropping funnel. An equal volume of ethanol is added and the yellow solution heated to 70° C. Benzaldehyde (9 ml.) in ethanol (25 ml.) is added, whereupon a bright yellow precipitate forms. Normal sodium bicarbonate solution (20 ml.) is added dropwise over a five minute period and the yellow mixture stirred 15 minutes at 70°. An additional 40 ml. of bicarbonate are added rather quickly, whereupon the precipitate turns orange. The mixture is stirred at 70–80° for 15 minutes and then filtered hot. The precipitate is washed with ethanol and dried in vacuo. The yield of 3-benzylidenehydrazino - 9 - phenyl - 1,2,8,9 - tetraazaphenalene as an orange-red solid, M.P. 210–215° C. is 4.4 g. When recrystallized from methyl Cellosolve, the intermediate is obtained in dark red plates melting in the range 216–222° C.

The 3-benzylidenehydrazino compound (17.9 g.) is suspended in a large excess of 6 N hydrochloric acid and boiled until a clear solution is obtained. The solution is evaporated to dryness at reduced pressure and the residue recrystallized twice from methanol-ether to afford 3-hydrazine - 9 - phenyl - 1,2,8,9 - tetraazaphenalene as a yellow crystalline product, M.P. 176–178°.

EXAMPLE 19

3-hydrazino-9-methyl-1,2,8,9-tetraazaphenalene

In a 1-liter flask equipped with reflux condenser and mechanical stirrer is placed 100% hydrazine hydrate (162 ml.) and water (60 ml.) and the solution heated to 90°. 3-thiono-9-methyl-2,3-dihydro-1,2,8,9-tetraazaphenalene (6.48 g.) is added and the mixture stirred 20 hours at reflux. The mixture is filtered hot to remove some red solid and the filtrate evaporated in vacuo. The residual yellow solid is taken up in 3 N hydrochloric acid (400 ml.) filtered to remove insoluble yellow solid and evaporated to dryness in vacuo. The residue is dissolved as well as possible in water and refiltered. Evaporation of the filtrate in vacuo yields the product as a pale yellow solid residue.

The solid is purified by dissolving it in water (50 ml.) and ethanol (50 ml.) and treating it at 70° under mechanical stirring with benzaldehyde (15 ml.) in ethanol (50 ml.). Water (25 ml.) is added, followed by 1 N sodium bicarbonate (100 ml.) and the mixture stirred for 5 minutes at 70°. More 1 N sodium bicarbonate is added and the mixture stirred for 10 minutes at reflux. The mixture is cooled and the orange benzylidene hydrazone collected, washed with water and treated with boiling excess 2 N hydrochloric acid under stirring until no odor of benzaldehyde remains and a clear yellow solution is obtained (about 5 hours). The solution is cooled, filtered through sintered glass and the filtrate evaporated to dryness in vacuo. The residual solid is thoroughly dried in a desiccator under vacuum over phosphorus pentoxide and then recrystallized from methanol-ether. A second recrystallization from methanol-ether yields 4.4 g. of pale yellow crystals which decompose with gas evolution at about 260°.

Calcd. for $C_{10}H_{10}N_6 \cdot 2HCl$ (percent): C, 41.83; H, 4.21; N, 29.26; Cl, 24.70. Found (percent): C, 41.89; H, 4.18; N, 29.10; Cl, 24.44.

EXAMPLE 20

3-phenylhydrazino-9-phenyl-1,2,8,9-tetraazaphenalene (a) 3-chloro-9-phenyl - 1,2,8,9-tetraazaphenalene.—To a stirred mixture of phosphorus pentachloride (6.3 g.) in phosphorus oxychloride (40 ml.) is added finely powdered 3-keto-9-phenyl-2,3 - dihydro - 1,2,8,9-tetraazaphenalene (7.8 g.). The mixture is stirred at reflux for 165 minutes under moisture exclusion, then poured cautiously into ice, and rendered alkaline under cooling with 20° sodium hydroxide solution. The fine yellow precipitate which forms is collected and washed with water, stirred for ½ hour in 600 ml. of warm (50°) water and again filtered. The precipitate is recrystallized from ethanol and 5.4 g. of yellow crystals, M.P. 225–228°, obtained. The infrared spectrum shows no trace of carbonyl absorption as seen in the starting material.

Calcd. for $C_{15}H_9ClN_4$ (percent): C, 64.18; H, 3.24; N, 19.96; Cl, 12.63. Found (percent): C, 64.21; H, 3.08; N, 19.70; Cl, 12.67.

(b) 3-phenylhydrazino-9 - phenyl - 1,2,8,9-tetraazaphenalene.—A mixture of 3-chloro-9-phenyl-1,2,8,9-tetraazaphenalene (1.0 g.) and phenylhydrazine (25 ml.) is stirred at 150° C. for 20 hours. Most of the phenylhydrazine is then removed by distillation at reduced pressure. The residue is triturated with aqueous sodium bicarbonate and then taken up in chloroform. The chloroform solution is dried over sodium sulfate, concentrated in vacuo to about 6 ml. and passed through a column of basic alumina. Fractions are checked by thin layer chromatography of small samples. The desired material is obtained from the second and third fractions whereas undesired material is collected in fractions 4–9. The combined second and third fractions are concentrated in vacuo and the residue recrystallized once from dimethylformamide-water and once from acetone. The orange crystalline product (200 mg.) melts in the range 265–267°.

Calcd. for $C_{21}H_{16}N_6$ (percent): C, 71.57; H, 4.58; N, 23.85. Found (percent): C, 71.64; H, 4.11; N, 23.50.

EXAMPLE 21

3-hydrazino-9-phenyl-1,2,8,9-tetraazaphenalene

A mixture of 100% hydrazine hydrate (10 ml.), methyl Cellosolve (30 ml.) and 3-chloro-9-phenyl-1,2,8,9-tetraazaphenalene (2 g.) is stirred for 4 hours at reflux, during which time a yellow solution is obtained. This is filtered hot and the filtrate treated with water (30 ml.) and cooled overnight. The yellow precipitate which has formed is collected, washed with water and dried. The crude 3-hydrazino-9-phenyl - 1,2,8,9-tetraazaphenalene (1.4 g.) then obtained is suspended in 3 N hydrochloric acid, filtered, the filtrate treated with charcoal and refiltered. The yellow filtrate is evaporated in vacuo at 60° to a yellow-red foam. This foam is taken up in water and washed with chloroform. The aqueous acidic layer is evaporated in vacuo and a pale yellow solid (0.85 g.) obtained. This material may then be purified through formation and hydrolysis of 3-benzylidenehydrazino-9- phenyl-1,2,8,9-tetraazaphenalene in a fashion analogous to that described in Example 18.

EXAMPLE 22

3-hydrazino-7-phenyl-1,2,8,9-tetraazaphenalene

By treating 3-keto-7-phenyl-2,3-dihydro-1,2,8,9-tetraazaphenalene (5 g.) with phosphoryl chloride (27 ml.) and phosphorus pentachloride (4 g.) at reflux, evaporating the mixture and isolating the solid obtained upon quenching an acetone solution of the residue in ice-water, there is obtained 3-chloro-7-phenyl-1,2,8,9-tetraazaphenalene, M.P. 278–288°.

A mixture of 3 - chloro - 7-phenyl-1,2,8,9-tetraazaphenalene (8.3 g.), hydrazine hydrate (71 ml.) and water (15 ml.) is heated at reflux for 24 hours. The mixture is cooled and filtered and the precipitate collected, washed thoroughly with water and suspended in dilute hydrochloric acid. The mixture is filtered and evaporated to dryness at reduced pressure. The residue is taken up in water, filtered and evaporated to dryness. The residual solid is triturated with a mixture of absolute ethanol and ether to yield the dihydrochloride of 3-hydrazino-7-phenyl-1,2,8,9-tetraazaphenalene, M.P. 210–215° (dec.). The product may be further purified through formation of the hydrazone, as described in Example 23.

EXAMPLE 23

9-benzylidenehydrazino-7-phenyl-1,2,8,9-tetraazaphenalene

To a stirred solution of 3-hydrazino-7-phenyl-1,2,8,9-tetraazaphenalene dihydrochloride (1.62 g.) in methanol (10 ml.) at 60° is added benzaldehyde (0.6 ml.) in methanol (10 ml.). One normal aqueous sodium bicarbonate solution (5 ml.) is next added and the mixture is stirred at reflux for 10 minutes. An additional 5 ml. of bicarbonate are added and the mixture is filtered hot, the precipitate is washed with methanol and water, dried, and recrystallized from aqueous methyl Cellosolve to yield the product, M.P. above 350°.

EXAMPLE 24

3-(m-nitrobenzylidenehydrazino)-1,2,8,9-tetraazaphenalene 3-hydrazino-1,2,8,9-tetraazaphenalene dihydrochloride (1.4 g.) in water (10 ml.) and ethanol (10 ml.) is heated to 70° C., and a solution of m-nitrobenzaldehyde (0.75 g.) in ethanol (10 ml.) added with stirring. An orange color develops at once. Molar sodium bicarbonate solution (5 ml.) is added and the solution is refluxed 5 minutes. An orange-red precipitate develops. Addition of another 5 ml. of 1 N sodium bicarbonate solution, followed by 15 minutes at reflux, results in the formation of a thick red precipitate. The material is collected from the cooled mixture, washed with water and ethanol and dried in vacuo. The yield of material, M.P. >350°, is 1.54 g. or 92% of theory. Two recrystallizations from dimethylformamide yield analytically pure material, M.P. >350° C.

Calcd. (percent): C, 57.65; H, 3.33; N, 29.42. Found (percent): C, 57.57; H, 3.57; N, 29.23.

EXAMPLE 25

In a similar fashion to that described in Example 24, the following compounds are prepared from the appropriate aldehydes:

3-(p-cyanobenzylidenehydrazino)-1,2,8,9-tetraazaphenalene, M.P. above 350°
3-cinnamylidenehydrazino-1,2,8,9-tetraazaphenalene, M.P. 235–239°
3-(3-indolylmethylidenehydrazino)-1,2,8,9-tetraazaphenalene, M.P. above 350°
3-(3,4-dimethoxybenzylidenehydrazino)-1,2,8,9-tetraazaphenalene, M.P. 235–237°
3-(4-acetamidobenzylidenehydrazino)-1,2,8,9-tetraazaphenalene, M.P. above 350°
3-(3,4-dichlorobenzylidenehydrazino)-1,2,8,9-tetraazaphenalene, M.P. above 350°
3-(2-picolylidenehydrazino)-1,2,8,9-tetraazaphenalene, M.P. 257–258°
3-(4-dimethylaminobenzylidenehydrazino)-1,2,8,9-tetraazaphenalene, M.P. 274–276°
3-(3,4,5,-trimethoxybenzylidenehydrazino)-1,2,8,9-tetraazaphenalene, M.P. 265–267°
and 3-benzylidenehydrazino-1,2,8,9-tetraazaphenalene, color change (orange to yellow) 265–267°; decomp. at 330–338°.

What is claimed is:

1. A compound of the formula:

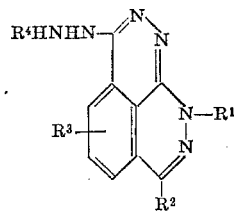

wherein
 $R^1$ is hydrogen, (lower)alkyl, phenyl or phenyl(lower) alkyl;
 $R^2$ is hydrogen or phenyl;
 $R^3$ is hydrogen, chloro, bromo, hydroxy, (lower) alkoxy or nitro; and
 $R^4$ is hydrogen or phenyl.

2. The pharmaceutically acceptable non-toxic acid addition salts of a compound according to claim 1.

3. A compound according to claim 1 wherein $R^3$ is hydrogen, hydroxy or (lower)alkoxy and $R^2$ and $R^4$ are each hydrogen.

4. The pharmaceutically acceptable non-toxic acid addition salts of a compound according to claim 3.

5. A compound according to claim 1 wherein said compound is 3-hydrazino-1,2,8,9-tetraazaphenalene.

6. The pharmaceutically acceptable non-toxic acid addition salts of the compound of claim 5 with acids.

7. The salt of claim 6 wherein the acid is hydrochloride.

8. A compound according to claim 1 wherein said compound is 3-hydrazino-9-methyl - 1,2,8,9 - tetraazaphenalene.

9. The pharmaceutically acceptable non-toxic acid addition salts of the compound of claim 8 with acids.

10. The compound according to claim 1 wherein said compound is 3-hydrazino-9-benzyl-1,2,8,9-tetraazaphenalene.

11. The compound according to claim 1 wherein said compound is 3-($\beta$-phenylhydrazino) - 9 - phenyl-1,2,8,9-tetraazaphenalene.

References Cited

The Ring Index, 2nd edition, p. 433, McGregor & Werner, Inc. (1960).

JOHN D. RANDOLPH, Primary Examiner

U.S. Cl. X.R.

260—240, 343.3, 475, 521, 999

PO-1050
(5/69)

UNITED STATES PATENT OFFICE
CERTIFICATE OF CORRECTION

Patent No. 3,578,665            Dated May 11, 1971

Inventor(s) Karl J. Doebel and John E. Francis

It is certified that error appears in the above-identified patent and that said Letters Patent are hereby corrected as shown below:

Col. 5, Line 72 - "(10 ml.)" should be -- (100 ml.) --

Col. 6, Line 4 - "50 ml." should be -- 500 ml. --

Col. 6, Line 51 - "(approx. 1.0 mole)" should be -- (approx. 0.1 mole)

Col. 7, Line 31 - "carbon tetrachloric" should be -- carbon tetrachloride

Col. 7, Line 41 - "25.2 g.)" should be -- (25.2 g.) --

Col. 7, Line 42 - "(1.72 ml.)" should be -- (172 ml.) --

Col. 8, Line 3 - "1735 cm.'$^{-1}$" should be -- 1735 cm$^{-1}$ --

Signed and sealed this 18th day of January 1972.

(SEAL)
Attest:

EDWARD M. FLETCHER, JR.        ROBERT GOTTSCHALK
Attesting Officer                Acting Commissioner of Patents